US011118411B2

(12) United States Patent
Jackson et al.

(10) Patent No.: US 11,118,411 B2
(45) Date of Patent: Sep. 14, 2021

(54) DRILLING DEVICES AND METHODS OF OPERATING THE SAME

(71) Applicant: CELLULA ROBOTICS, LTD., Burnaby (CA)

(72) Inventors: James Eric Jackson, New Westminster (CA); Don R. Clarke, Trail (CA); Sina Doroudgar, Coquitlam (CA)

(73) Assignee: Cellula Robotics Ltd.

(*) Notice: Subject to any disclaimer, the term of this patent is extended or adjusted under 35 U.S.C. 154(b) by 142 days.

(21) Appl. No.: 16/492,871

(22) PCT Filed: Mar. 9, 2018

(86) PCT No.: PCT/IB2018/000344
§ 371 (c)(1),
(2) Date: Sep. 10, 2019

(87) PCT Pub. No.: WO2018/162988
PCT Pub. Date: Sep. 13, 2018

(65) Prior Publication Data
US 2020/0063501 A1 Feb. 27, 2020

Related U.S. Application Data

(60) Provisional application No. 62/469,820, filed on Mar. 10, 2017.

(51) Int. Cl.
E21B 15/02 (2006.01)
E21B 7/02 (2006.01)
E21B 15/00 (2006.01)

(52) U.S. Cl.
CPC ............... *E21B 15/02* (2013.01); *E21B 7/02* (2013.01); *E21B 15/003* (2013.01)

(58) Field of Classification Search
CPC ........... E21B 15/02; E21B 7/02; E21B 15/003
See application file for complete search history.

(56) References Cited

U.S. PATENT DOCUMENTS 3,001,592 A * 9/1961 Lucas ................... E02B 17/021
175/8
3,392,794 A * 7/1968 Kurillo, Jr. ............. E21B 25/18
175/6
3,425,230 A * 2/1969 Haynes ................... B63C 11/44
405/185

(Continued)

FOREIGN PATENT DOCUMENTS

CN 109109999 1/2019
JP S54-18402 2/1979

(Continued)

OTHER PUBLICATIONS

Extended Search Report for European Patent Application No. 18764610.4, dated Nov. 9, 2020 8 pages.
Official Action with English Summary for Japan Patent Application No. 2019-571116, dated Sep. 8, 2020 5 pages.
International Search Report and Written Opinion prepared by the ISA/CA dated Sep. 12, 2018, for International Application No. PCT/IB2018/000344.

(Continued)

*Primary Examiner* — Aaron L Lembo
(74) *Attorney, Agent, or Firm* — Sheridan Ross P.C.

(57) ABSTRACT

A foot for a drilling device includes a foot frame and a plurality of louver assemblies attached to the foot frame. Each louver assembly includes a louver that is at a first position when the foot is on a surface and that is movable toward a second position to facilitate release of the foot from the surface.

20 Claims, 18 Drawing Sheets

(56) References Cited

U.S. PATENT DOCUMENTS

| | | | | |
|---|---|---|---|---|
| 3,456,448 | A * | 7/1969 | Luque | E02B 17/0017 |
| | | | | 405/196 |
| 3,512,811 | A * | 5/1970 | Moody | E02B 17/0008 |
| | | | | 285/288.1 |
| 3,670,830 | A * | 6/1972 | Van Der Wijden | E21B 19/146 |
| | | | | 175/52 |
| 3,889,927 | A * | 6/1975 | Becker | E21B 19/07 |
| | | | | 254/105 |
| 4,405,261 | A * | 9/1983 | Lawson | B63B 21/502 |
| | | | | 166/366 |
| 5,247,999 | A * | 9/1993 | Fowler | A62C 3/06 |
| | | | | 169/52 |
| 5,383,751 | A * | 1/1995 | Wheetley | B23B 39/00 |
| | | | | 408/1 R |
| 6,004,075 | A | 12/1999 | Haas | |
| 8,757,289 | B2 * | 6/2014 | Bauer | E02D 13/04 |
| | | | | 175/6 |
| 8,911,180 | B2 | 12/2014 | Finkenzeller et al. | |
| 9,140,068 | B2 * | 9/2015 | Bauer | E21B 7/124 |
| 10,472,892 | B1 * | 11/2019 | Conn, III | E21B 7/022 |
| 2014/0262562 | A1 * | 9/2014 | Eldib | E21B 15/003 |
| | | | | 180/8.5 |
| 2017/0002534 | A1 | 1/2017 | Alford et al. | |

FOREIGN PATENT DOCUMENTS

| | | |
|---|---|---|
| JP | S58-131293 | 8/1983 |
| WO | WO 96/20313 | 7/1996 |
| WO | WO 2013/109147 | 7/2013 |
| WO | WO 2016/200265 | 12/2016 |

OTHER PUBLICATIONS

International Search Report and Written Opinion for International (PCT) Patent Application No. PCT/IB2018/000344, dated Sep. 12, 2018 7 pages.

International Preliminary Report on Patentability for International (PCT) Patent Application No. PCT/IB2018/000344, dated Sep. 19, 2019 5 pages.

* cited by examiner

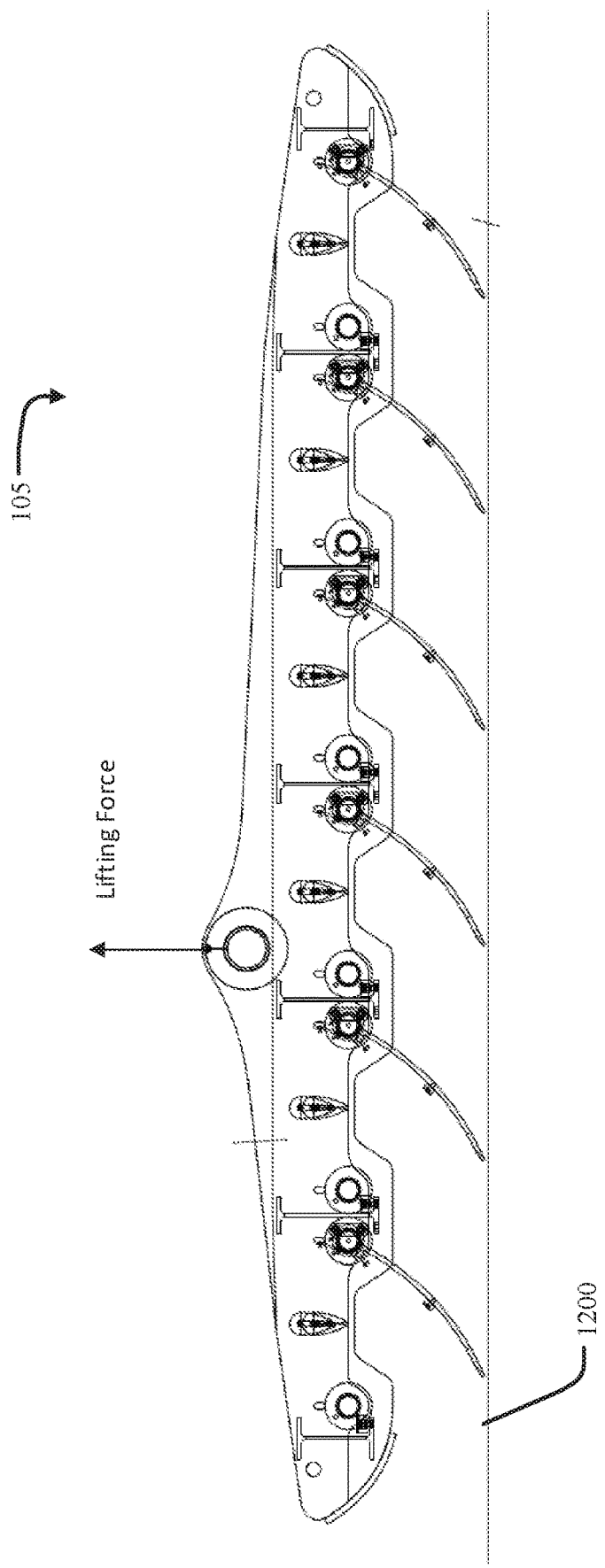

DRILLING DEVICES AND METHODS OF OPERATING THE SAME

CROSS REFERENCE TO RELATED APPLICATIONS

This application is a national stage application under 35 U.S.C. § 371 and claims the benefit of PCT Application No. PCT/IB2018/000344 having an international filing date of Mar. 9, 2018, which designated the United States, which PCT application claimed the benefit of priority under 35 U.S.C. § 119(e) to U.S. Provisional Application 62/469,820, filed on Mar. 10, 2017, the entire disclosures of which are incorporated herein by reference.

FIELD

Example embodiments relate to driving devices and methods for operating the same, for example, underwater drilling devices and methods of operating the same.

BACKGROUND

Drilling devices are used in many applications including but not limited to gas/oil extraction, soil collection, etc. Some of these drilling devices are designed for underwater environments, where the drilling device rests on the bottom of a body of water of interest (e.g., seafloor, lakebed, etc.) during operation. In these cases, soft floor conditions can cause the drilling device to sink too far into the floor, which may lead to difficulties with operating and/or retrieving the drilling device.

BRIEF DESCRIPTION OF THE DRAWINGS

The present disclosure is described in conjunction with the appended figures, which are not necessarily drawn to scale:

FIG. 12E illustrates a fifth stage of how the foot in FIGS. 1-11 is released from a surface according to at least one example embodiment;

DETAILED DESCRIPTION

Example embodiments are directed to drilling devices (e.g., underwater drilling devices) that enable safe operation and easy retrieval from the seafloor, for example, a soft seafloor.

To enable a drill to operate on the seafloor, for example in soft seafloor conditions, example embodiments are directed to a set of outrigger legs to increase the landed surface area. The general arrangement of the drill allows for the drill to be easily recovered from a sea floor, even in the case of a "dead drill," which can result from a number of system failures including, but not limited to, loss of electrical power, loss of control, loss of hydraulic power. In more detail, example embodiments employ a set of movable louvers on the outrigger feet. When planted on the ground or seafloor, the louvers increase landing surface area of the drill and prevent the feet from sinking too far into the seafloor during normal operation of the drill. Notably, the feet may experience natural suction to a soft seafloor after landing on the soft seafloor due to cavities created underneath the feet/louvers in the seafloor. To recover the drill, the drill is lifted by its umbilical and the outrigger legs start to retract (e.g., under control of hydraulics) such that the suction force opens the louvers to assist with release of the feet from the seafloor. For example, the louvers are in a first position (or closed position) when the feet are resting on the seafloor (or resting surface), and movable toward a second position (or open position) to assist with release of the feet from the seafloor.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

Figure 1:
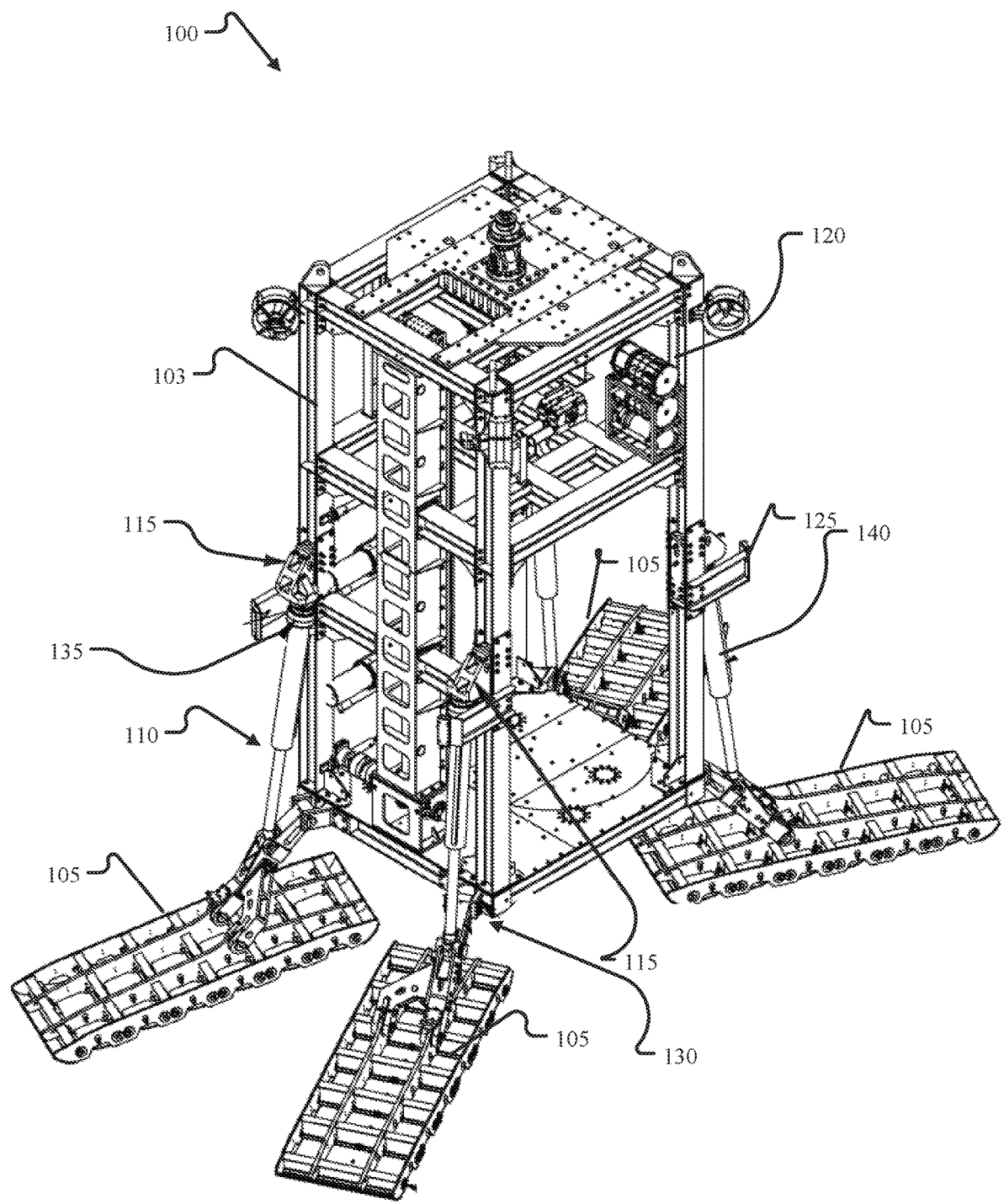
FIG. 1 illustrates a perspective view of a drilling device according to at least one example embodiment.
Figure 2:
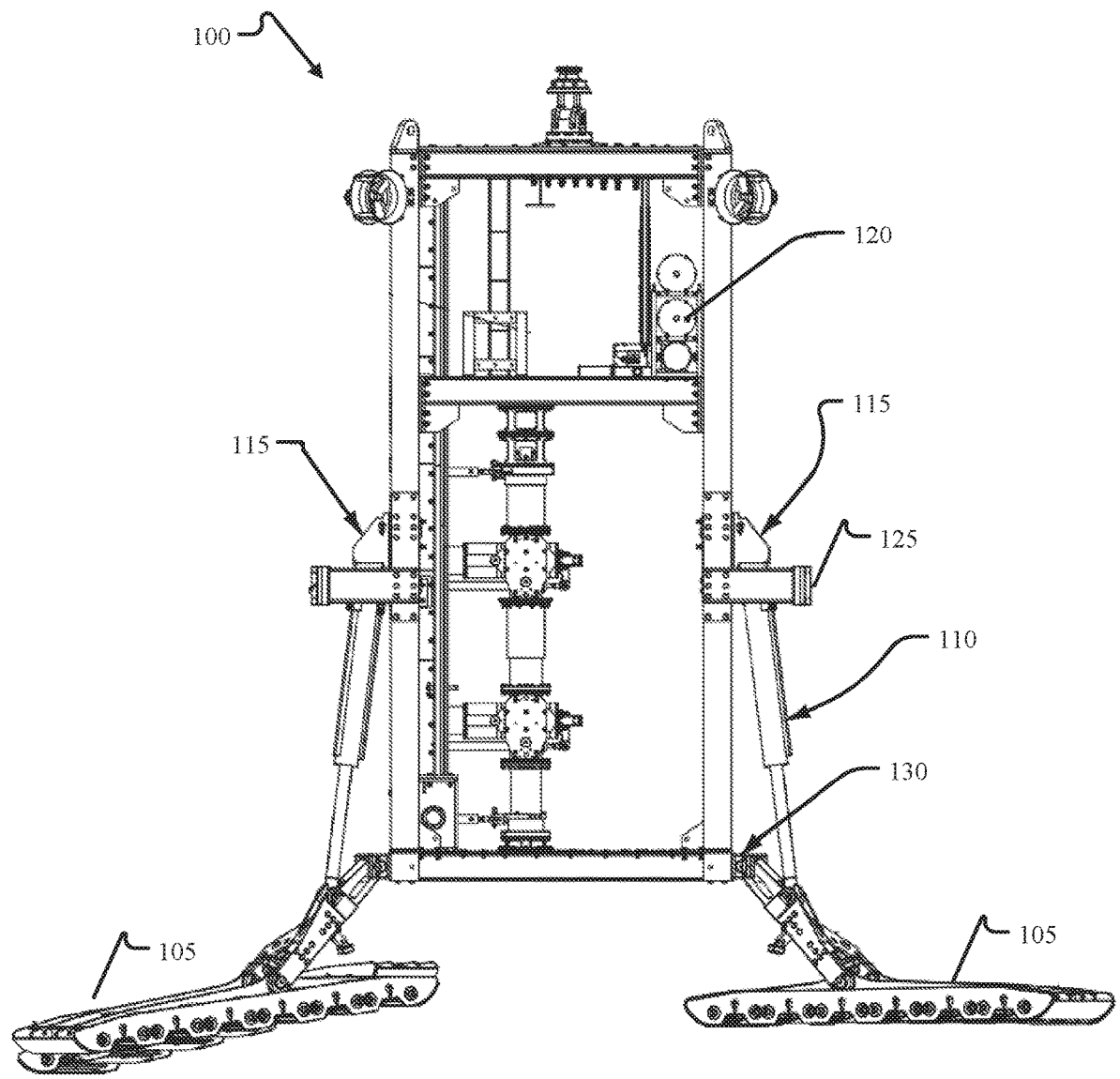
FIG. 2 illustrates a side view of the drilling device shown in FIG. 1 according to at least one example embodiment.
Figure 3:
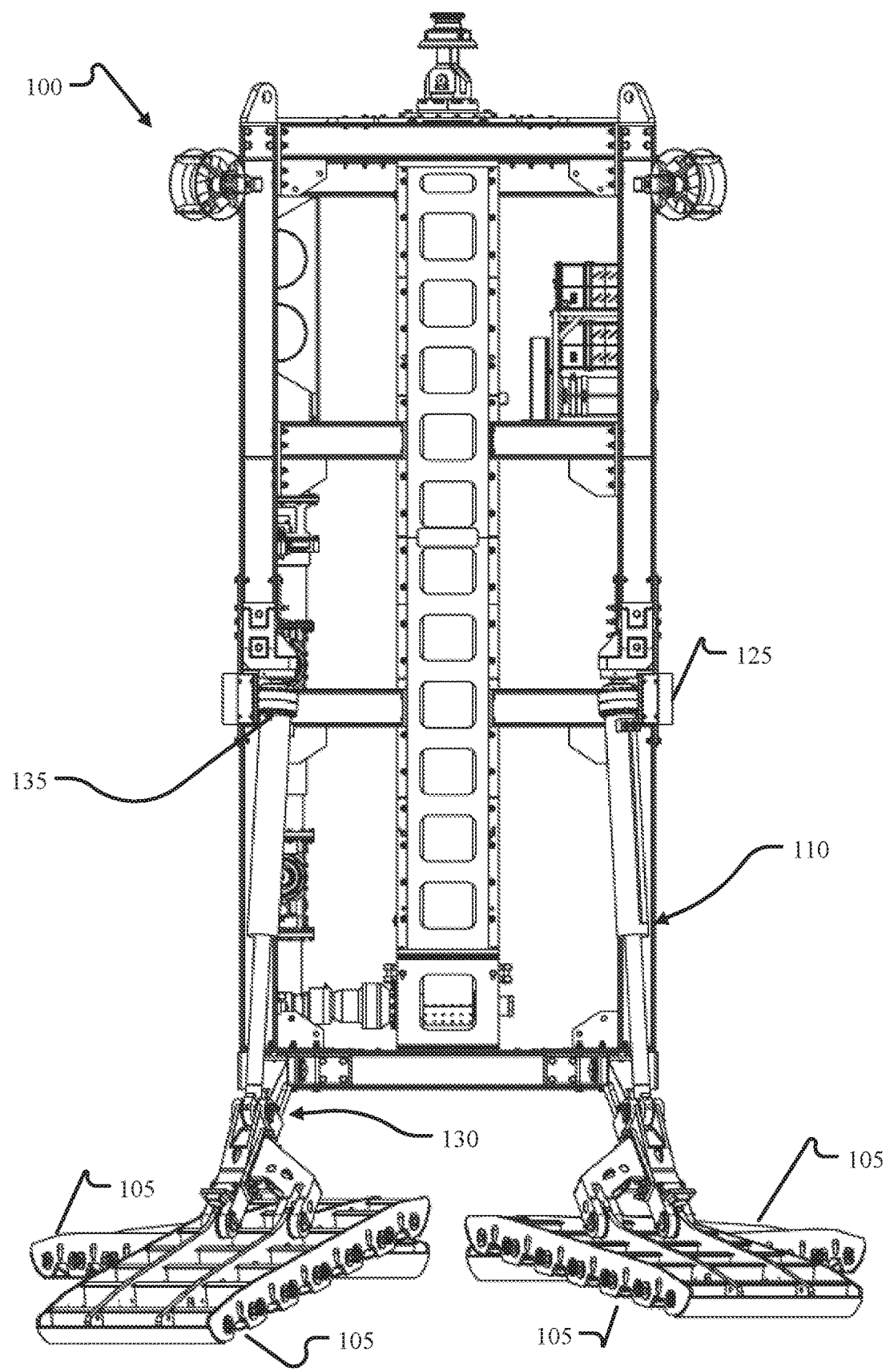
FIG. 3 illustrates a front view of the drilling device shown in FIG. 1 according to at least one example embodiment.
Figure 4:
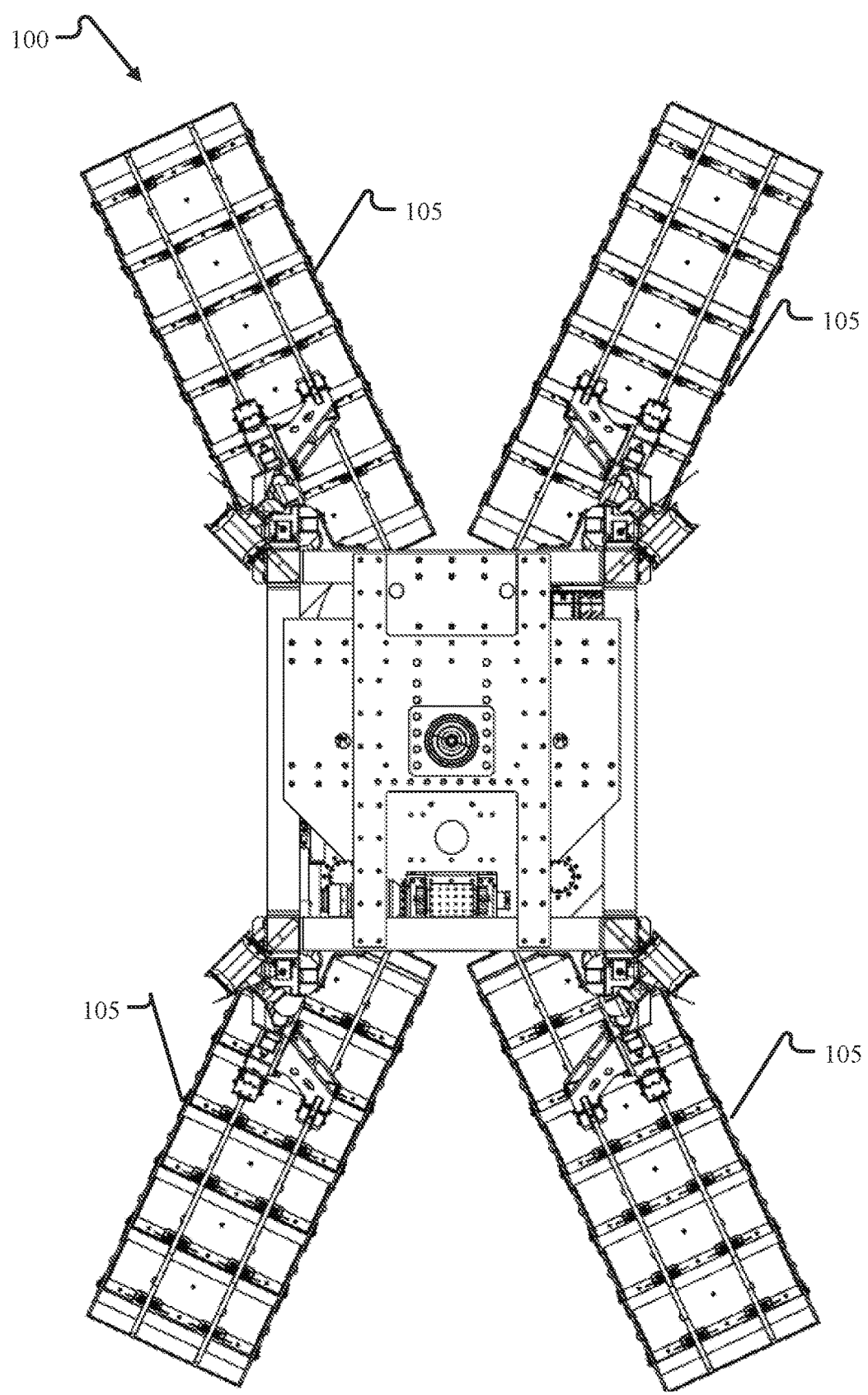
FIG. 4 illustrates a top view of the drilling device shown in FIG. 1 according to at least one example embodiment.

FIG. 1 illustrates a perspective view of a drilling device (or drill) 100 according to at least one example embodiment. FIG. 2 illustrates a side view of the drilling device 100 shown in FIG. 1 according to at least one example embodiment. FIG. 3 illustrates a front view of the drilling device 100 shown in FIG. 1 according to at least one example embodiment. FIG. 4 illustrates a top view of the drilling device 100 shown in FIG. 1 according to at least one example embodiment.

With reference to FIGS. 1-4, the drilling device 100 includes a drill frame 103. The drill frame 103 may include one or more drilling components for penetrating into a surface (e.g., a surface underwater). According to at least one example embodiment, the drill 100 may be outfitted to perform a cone penetrometer test (CPT) to collect soil samples for later analysis. Thus, although not necessarily explicitly labeled, it should be understood that the one or more drilling components may include any components normally associated with performing a CPT, such as a penetration rod, sample collectors, etc. FIG. 1 shows an example that includes two oil compensators and a CPT-specific electronic can 120. If the drill 100 is an underwater drill, the drill 100 may be deployable from a surface vessel, an autonomous underwater vehicle (AUV), and/or a remotely operated underwater vehicle (ROV).

As shown, the drill 100 includes one or more feet 105 attached to the drill frame 103 and that contact a surface to support the drill frame 103. Although FIGS. 1-4 show four feet 105, it should be understood that fewer or more feet may be included according to design preferences. The components of the one or more feet 105 are described in more detail below with reference to FIGS. 6-13E.

The drill 100 may include one or more leg assemblies 110 for attaching a corresponding one of the one or more feet 105 to the drill frame 103. Each leg assembly 110 includes at least a first end attached to the drill frame 103 and at least second end attached to a foot frame of the foot 105. FIGS. 1-4 illustrate an example embodiment in which the leg assembly 110 includes two portions attached to the drill frame 103. One portion of the leg assembly 110 is connected to the drill frame 103 with an upper bracket assembly 115, and another portion of the leg assembly 110 is connected to the drill frame 103 with a lower bracket assembly 130. Here, the upper bracket assembly 115 and lower bracket assembly 130 may serve as the main support for the drill frame 103.

According to at least one example embodiment, each leg assembly 110 includes a hydraulic element 140 that raises and lowers the one or more feet 105 to level the drill 100 on a surface. As shown, the hydraulic element 140 is at a center portion of the leg assembly 110 and attached to the drill frame 103. According to at least one example embodiment, the hydraulic element 140 is offset from a center of the foot 105. The attachments of the leg assembly 110 to the drill frame 103 and a corresponding foot frame are shown in more detail in FIGS. 5 and 6. Each leg assembly 110 may also include a ball joint assembly 135 (e.g., with a ball and associated joint) that attaches to the upper bracket assembly 115.

The drill 100 may further include protective bumpers 125, which may be useful for protecting the drill 100 while the drill 100 is in transport or storage. The bumpers 125 may also serve as a resting place of the leg assemblies 110 during transport or storage.

Figure 5:
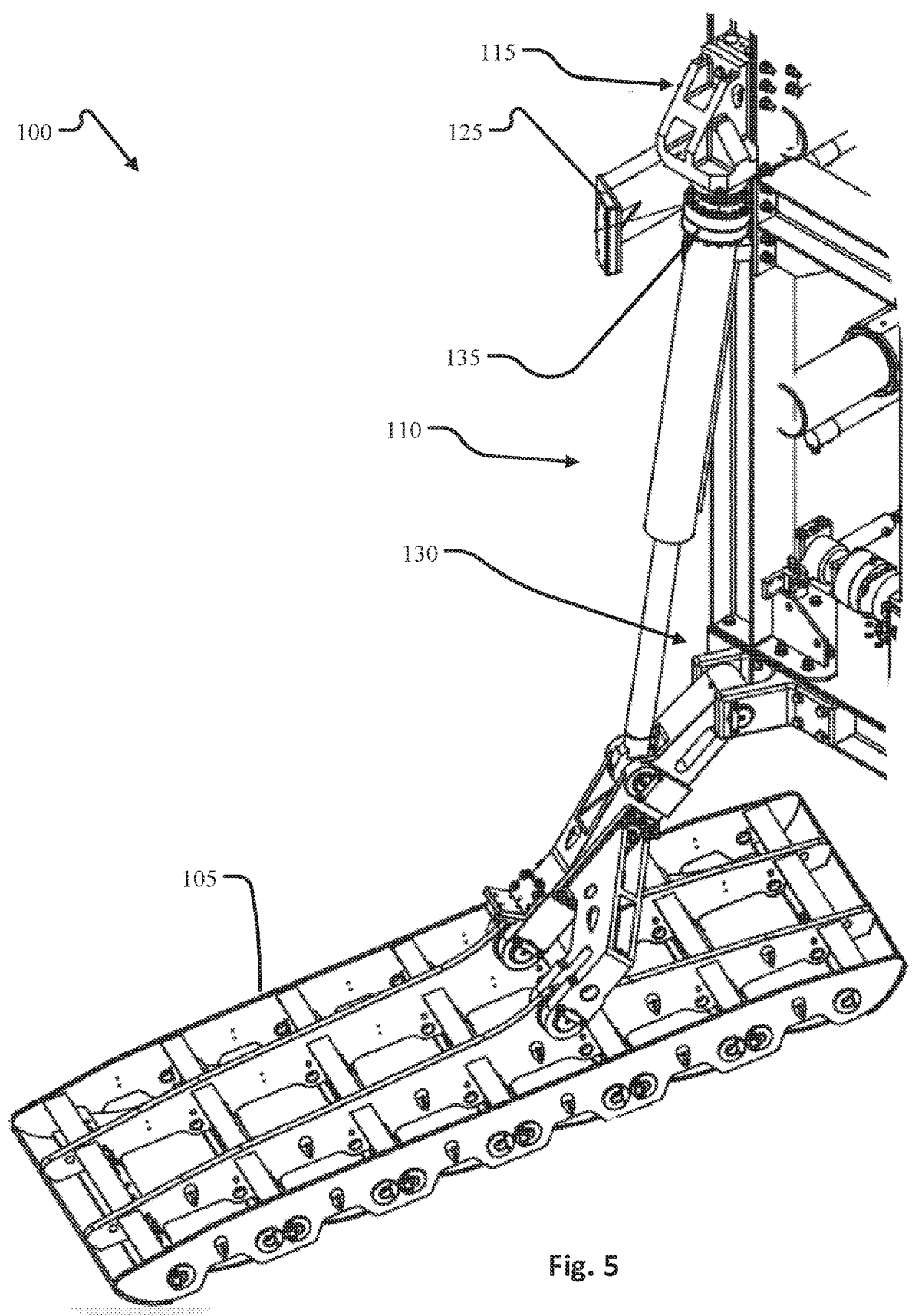
FIG. 5 illustrates a close-up view of a foot and a leg of the drilling device of FIG. 1 according to at least one example embodiment.
Figure 6:
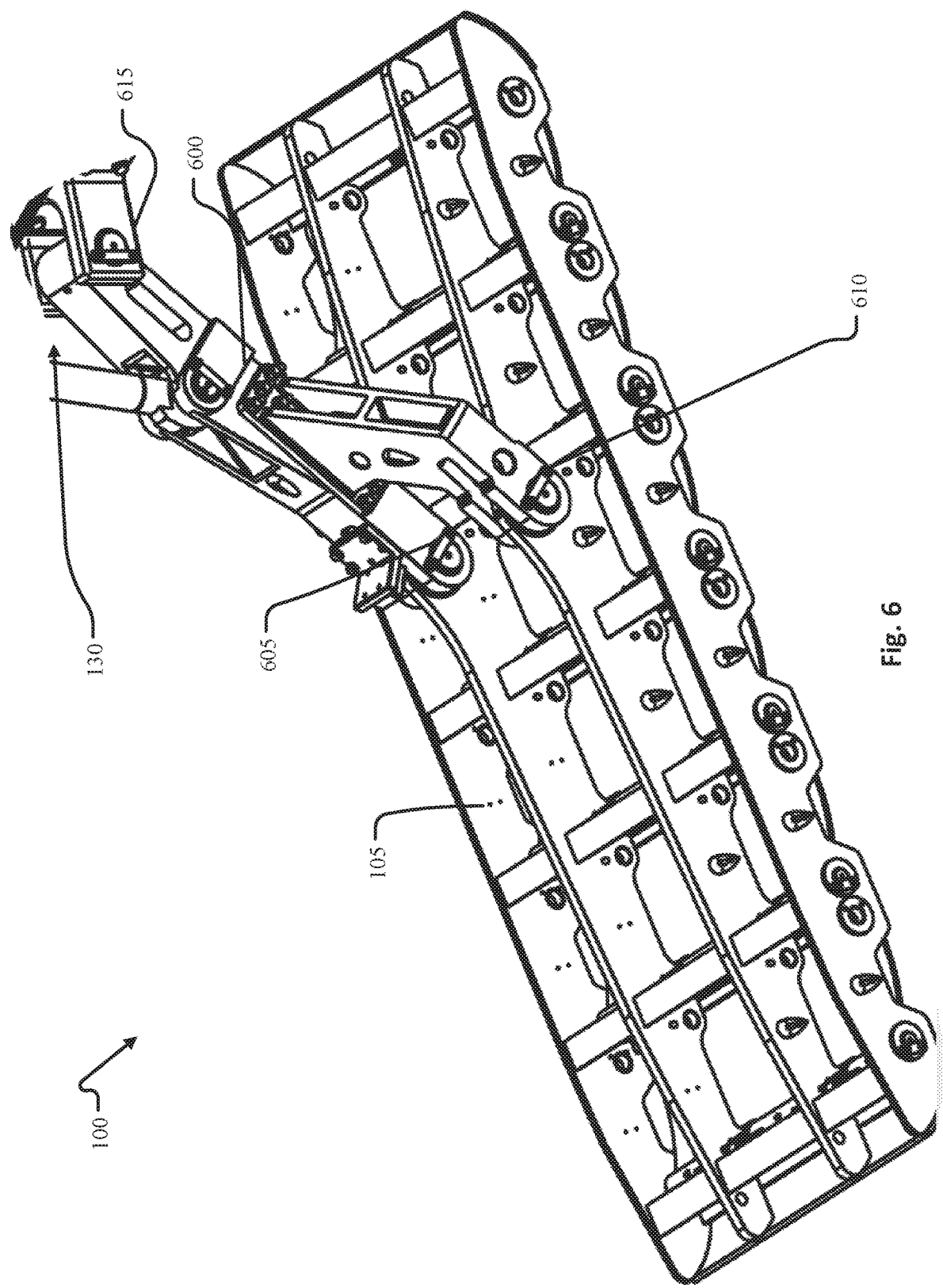
FIG. 6 illustrates a close-up view of the foot and the leg shown in FIG. 5 according to at least one example embodiment.

FIG. 5 illustrates a close-up view of a foot and a leg of the drilling device of FIG. 1 according to at least one example embodiment. FIG. 6 illustrates a close-up view of the foot shown in FIG. 5 according to at least one example embodiment.

FIGS. 5 and 6 illustrate the attachments of the leg assembly 110 to the drill frame 103 and a corresponding foot frame of a foot 105 in more detail. For example, FIG. 6 illustrates attachment points 600, 605, 610, and 615 to attach the leg assembly 110 to the lower bracket assembly 130 and the foot 105. Each attachment point 600, 605, 610, and 615 may have the same or similar attachment mechanisms, such as rods that pass through portions of the elements desired to be connected and that are held in place by stoppers. An example of such an attachment mechanism is discussed in more detail below with reference to the rods 723 and corresponding sets of stoppers 725 in FIGS. 7-11. That is, the same design for the rods, stoppers, and bushings illustrated and discussed with reference to FIGS. 7-11 may also apply to the attachment mechanism for attachment points 600, 605, 610, and 615. Each attachment point 600, 605, 610, and 615 may be capable of pivoting or may be fixed according to design preferences. Although not explicitly illustrated, it should be understood that other known attachment mechanisms are within the scope of example embodiments (connections that involve splined shafts, cotter pins, split collars, etc.).

Figure 7:
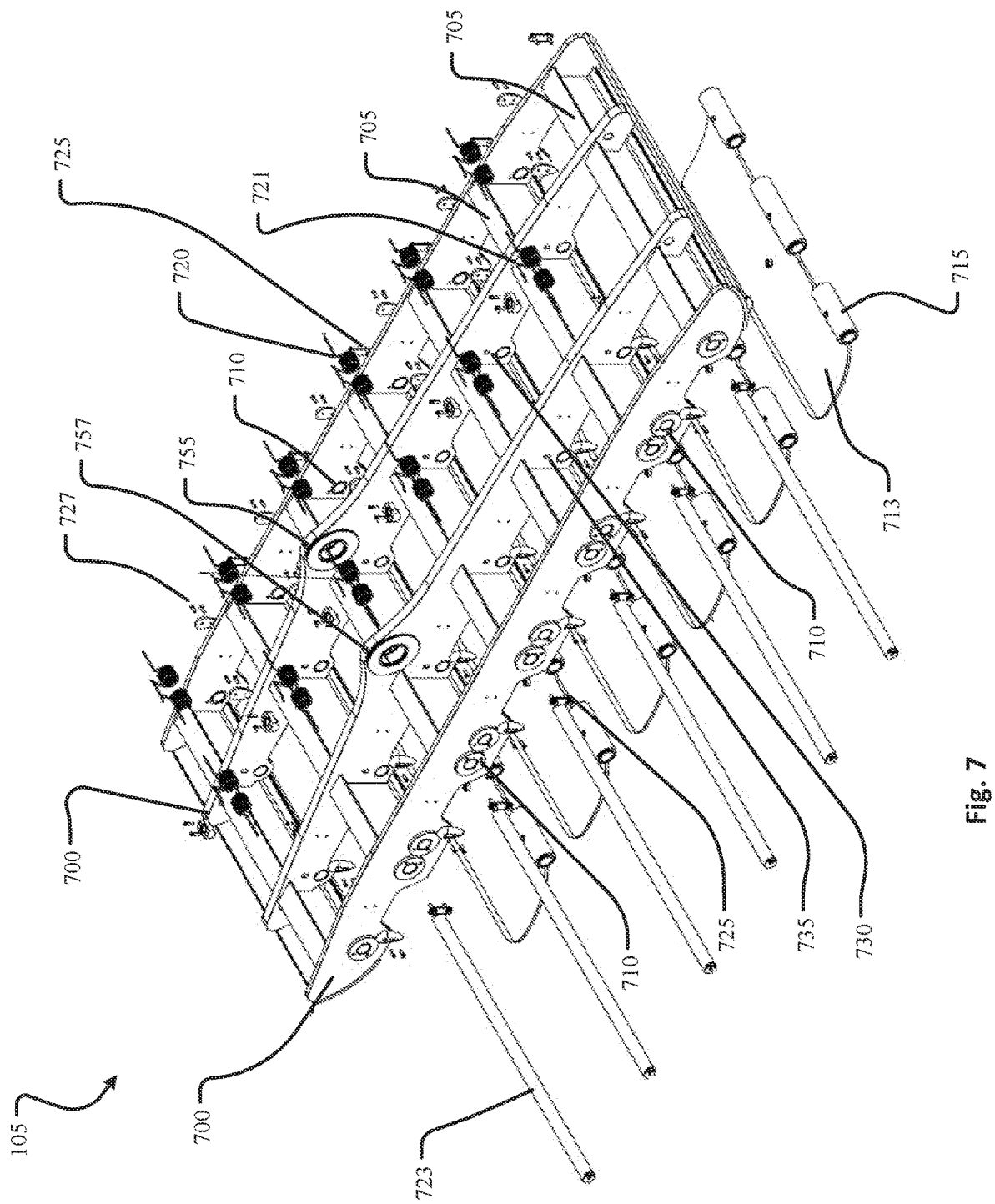
FIG. 7 illustrates an exploded view of the foot shown in FIGS. 1-6 according to at least one example embodiment.
Figure 8:
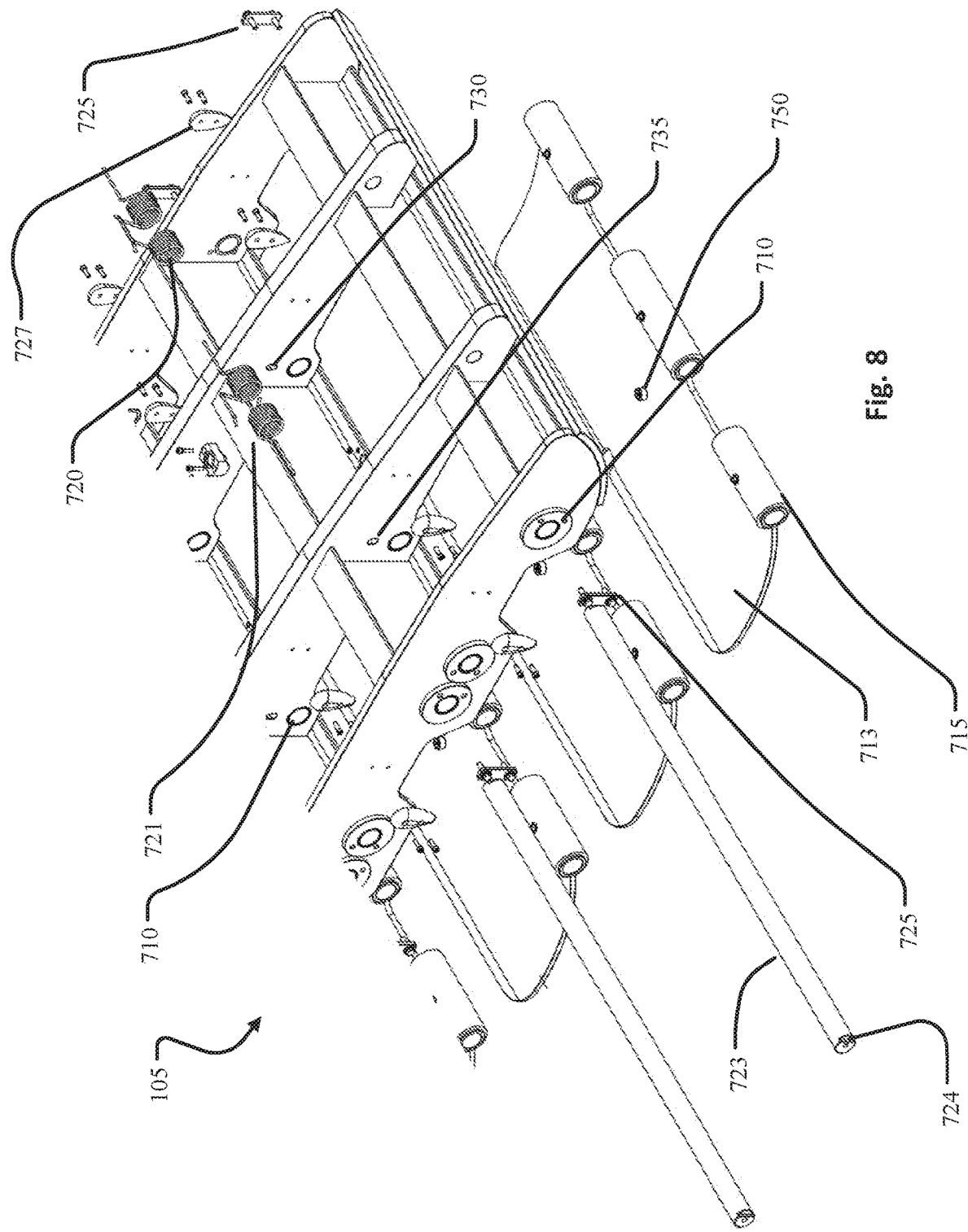
FIG. 8 illustrates close-up view of a portion of the foot shown in FIG. 7 according to at least one example embodiment.

FIG. 7 illustrates an exploded view of the foot 105 shown in FIGS. 1-6 according to at least one example embodiment. FIG. 8 illustrates close-up view of a portion of the foot 105 shown in FIG. 7 according to at least one example embodiment. In FIGS. 7 and 8, it should be understood that sides of elements that are not visible in the figures may be identical to the sides of the elements that are visible in the figures.

With reference to FIGS. 7 and 8, each foot 105 may include a foot frame comprised of a plurality of support rails 700 and a plurality of cross members 705. Each of the plurality of support rails 700 are parallel to one another and extend in a first direction. The plurality of cross members 705 are parallel to one another and intersect with the plurality of support rails 700. In the example of FIG. 7, a number of the plurality of support rails is four, and a number of the plurality of cross members is seven. However, more or fewer support rails and cross members may be used according to design preferences. In the example of FIG. 7, the support rails 700 include a first support rail and a second support rail that each include an attachment section 755/757 that attach to a leg assembly 110 of the drilling device 100 (see FIGS. 5 and 6). The attachment sections 755/757 are formed in raised portions of the first and second support rails 700. The attachment sections 755/757 may be holes to accommodate a fastening pin (or rod) of the leg assembly 110.

Although not explicitly shown it should be understood that in at least one example embodiment, a length of the foot 105 is about 116 inches, a width of the foot 105 is about 42 inches, and a height of the foot is about 15 inches.

As shown, each of the plurality of support rails 700 includes a plurality of holes 710. The holes 710 may be aligned with one another on a same plane (e.g., horizontal plane) and are designed to accommodate the rods 723. The support rails 700 may also include a plurality of anti-corrosion anodes (e.g., zinc anodes) 727 attached thereto for preventing or mitigating corrosion in underwater environments.

Figure 10:
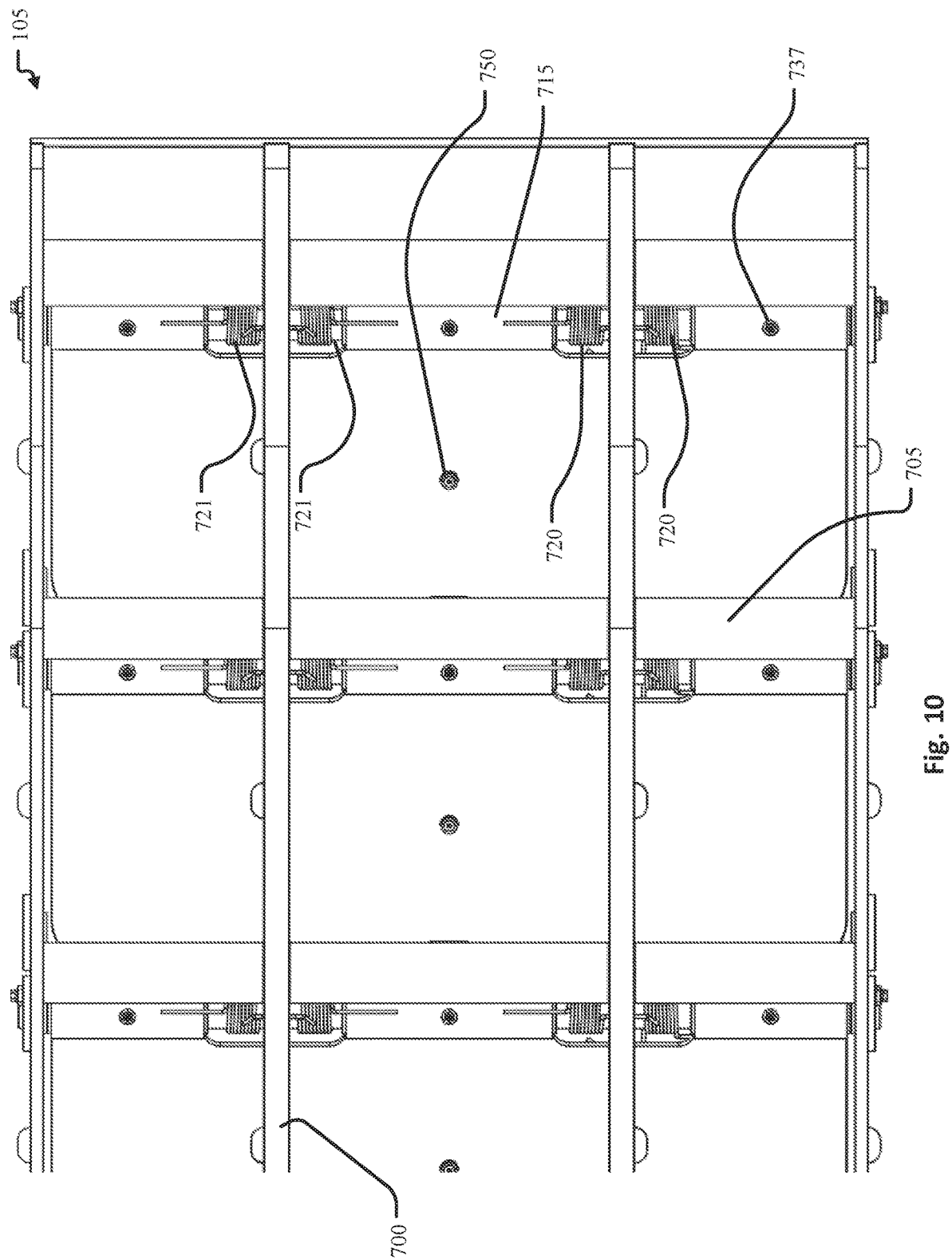
FIG. 10 illustrates a close-up top, assembled view of the foot shown in FIGS. 7 and 8 according to at least one example embodiment.

The foot 105 includes a plurality of louver assemblies attached to the foot frame. Each louver assembly includes a louver 713 that is at a first position when the foot 105 is on a surface and that is movable toward a second position to facilitate release of the foot 105 from the surface (see FIGS. 13A-13E). Each louver assembly includes one or more hollow connection elements 715 on a first side of the louver 713, one or more spring elements 720/721 that bias the louver 713 in a desired position (e.g., the first position), a rod 723, and a set of stoppers 725 to secure the rod 723 to the foot frame. The rod 723 that passes through the one or more hollow connection elements 715, the one or more spring elements 720/721, and a subset of the plurality of holes 710 (e.g., the set of holes aligned with one another across the support rails 700—see FIG. 10 illustrates an assembled close-up top view of the foot 105). According to at least one example embodiment, a number of the one or more hollow connection elements 715 is three, and each of the three hollow connection elements 715 is between two respective ones of the four support rails 700. However, a number of the connection elements 715 may vary according to design preferences. Each louver 713 may include one or more anti-corrosion anodes 750 (e.g., zinc anodes) that prevent or mitigate corrosion in underwater environments.

As shown in FIG. 8, each of a first end and a second end of the rod 723 includes a recessed surface portion 724. Further, the set of stoppers 725 include a first stopper fastened to a first outer support rail of the plurality of support rails 700 and that sits the recessed surface portion 724 of the first end of the rod 723, and a second stopper fastened to a second outer support rail of the plurality of support rails 700 and that sits the recessed surface portion 724 of the second end of the rod 723. This design prevents unwanted rotation and/or axial movement of the rod 723 when the foot 105 is assembled. As shown, the stoppers 725 may include two fasteners (e.g., bolts, screws, etc.) that engage with corresponding connection holes on the outer support rails 700. As noted above, the above design for securing the rods 723 may also be used as the attachment mechanisms for attachment points shown in FIG. 6.

The one or more spring elements may include a first pair of torsion springs 720 and a second pair of torsion springs 721. The first pair of torsion springs 720 are oppositely wound, and the second pair of torsion springs 721 are oppositely wound. That is, one spring in each pair is a left-wound torsion spring while the other spring in each pair is a right-wound torsion spring. Here, it should be understood that a number and a type of the spring elements may vary according to design preferences.

Figure 11:
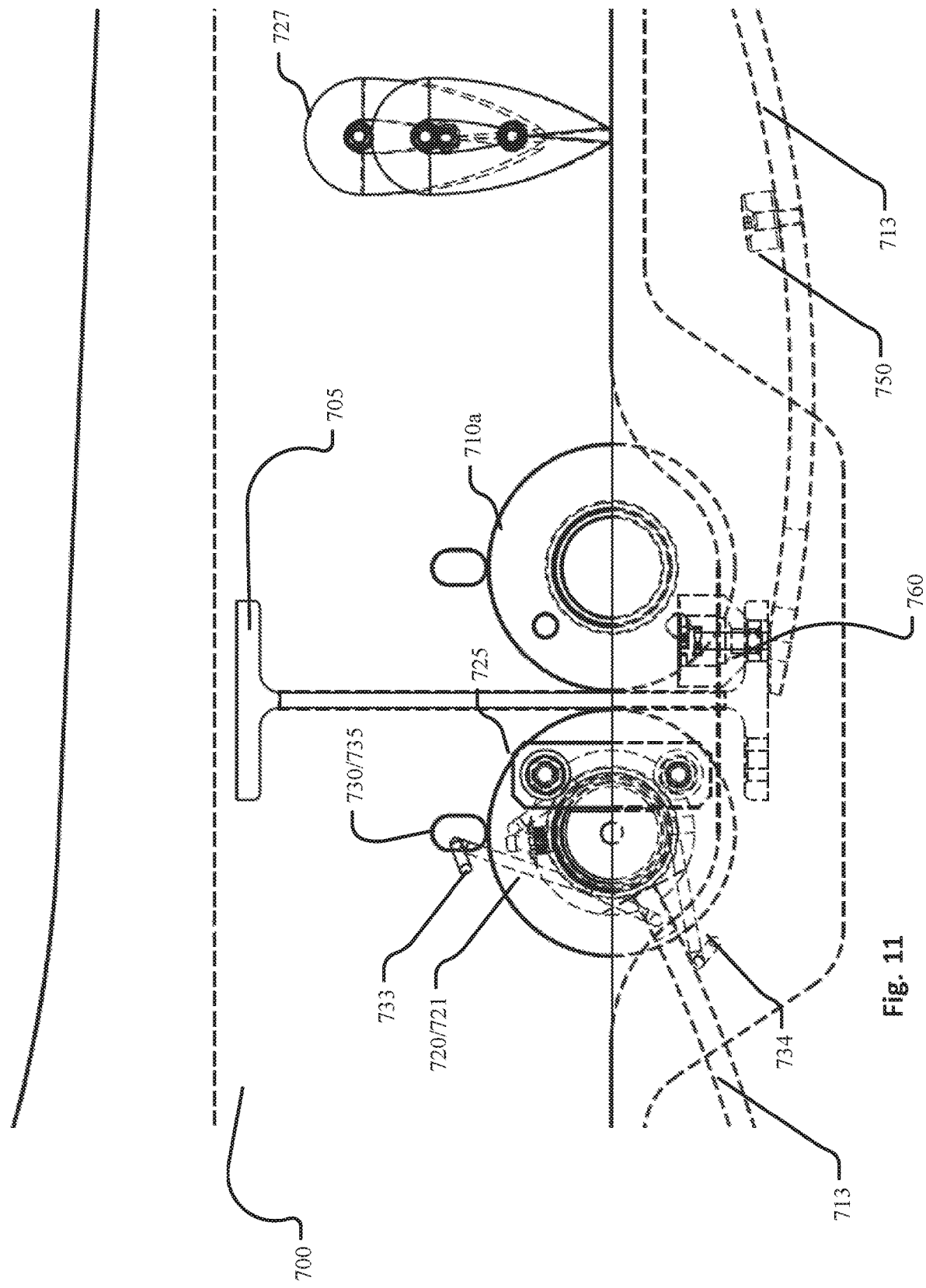
FIG. 11 illustrates a close-up side view of the foot shown in FIGS. 7-8 and 10 according to at least one example embodiment.

As shown in FIGS. 7 and 8, a first support rail (e.g., a first inner rail) of the plurality of support rails 700 includes a first opening 730 that accommodates one end of each spring in the first pair of torsion springs 720, and a second support rail (e.g., a second inner rail) of the plurality of support rails 700 includes a second opening 735 that accommodates one end of each spring in the second pair of torsion springs 721 (FIGS. 10 and 11 illustrate the connection of the springs to the support rails in more detail).

Figure 9:
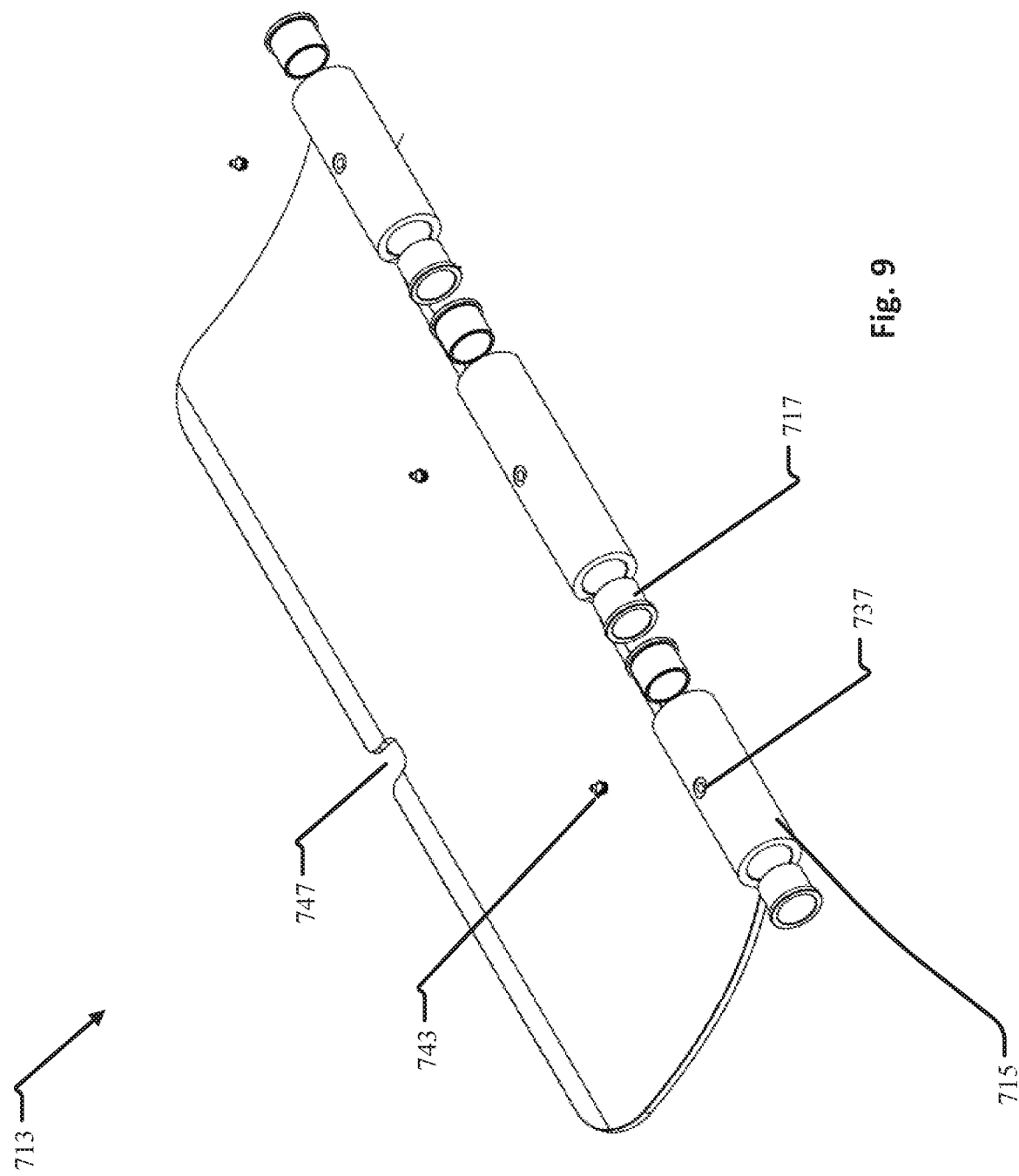
FIG. 9 illustrates an exploded view of a louver shown in FIGS. 7-8 according to at least one example embodiment.

FIG. 9 illustrates an exploded view of a louver 713 shown in FIGS. 7-8 according to at least one example embodiment.

As shown in FIG. 9, the louver 713 includes a plurality of bushings 717 (comprised of, for example, aluminum and bronze) that fit into the connection elements 715 and that allow a corresponding rod 723 to pass therethrough. Similarly, it should also be understood that the holes 710 in FIGS. 7 and 8 may include bushings in both sides of each hole 710. The connection elements 715 may include holes 737 for accommodating grease fittings (e.g., zerks) 743 that allow for greasing the bushings 717 and/or the rod 723. The louver 713 may include a recessed portion 747 for accommodating a water jet 760 (see FIG. 11).

FIG. 10 illustrates a top, assembled view of the foot 105 shown in FIGS. 7 and 8 according to at least one example embodiment. FIG. 11 illustrates a close-up side view of the foot shown in FIGS. 7-8 and 10 according to at least one example embodiment.

With reference to FIGS. 7-11, a number of the one or more hollow connection elements 715 is three, and each of the three hollow connecting elements 715 is between two respective ones of the four support rails 700. As further shown in the top view of FIG. 10, one spring element in the pair 720 is one side of a support rail 700 while the other spring element in the pair 720 is one the other side of the same support rail 700. Similarly, one spring element in the pair 721 is one side of a support rail 700 while the other spring element in the pair 721 is one the other side of the same support rail 700.

As shown in FIG. 11, ends 733 of the torsion springs 720/721 are in the openings 730/735 in the support rails 700. Other ends 734 of the springs 720/721 are designed to lie underneath the louver 713. Here, it should be understood that each louver 713 has two torsion spring pairs holding the louver 713 closed (or in a first position). The torsion springs 720/721 are designed to fit the geometry and load requirements of the foot 105 in order to be able to keep the louvers 713 closed under their own weight and be opened up to about 90 degrees when a downward load (such as suction load or weight of mud) is present. That is, ends 733 are fixed to the support rails 700 to keep the louver 713 closed under normal conditions while ends 734 are not fixed and allow the louver 713 to open to about a 90° angle when the louver 713 experiences a force in the direction of the ends 734 (e.g., due to release of the foot 105 from a soft surface). In other words, the louvers 713 operate similarly to a butt hinge.

FIG. 11 further shows a water jet 760 to loosen debris in case it is needed in a path of the water jet 760.

FIG. 11 further shows an unused hole 710*a*. These unused holes 710 allow for the louver assemblies to be disassembled and assembled in the opposite direction, which may be useful when the drill 100 lands on a seabed with a large slope. In this case, the rear feet of the drill 100 can be configured so that the direction of the louvers 713 are in line with the direction of potential drill slip to ensure that the louvers 713 do not open unexpectedly. In view of FIG. 11, it should be further understood that a flattened portion of the louver 713 rests against a bottom of the cross member 705.

FIGS. 12A-12G illustrate various stages of how the foot 105 in FIGS. 1-11 is released from a surface according to at least one example embodiment.

Figure 12A:
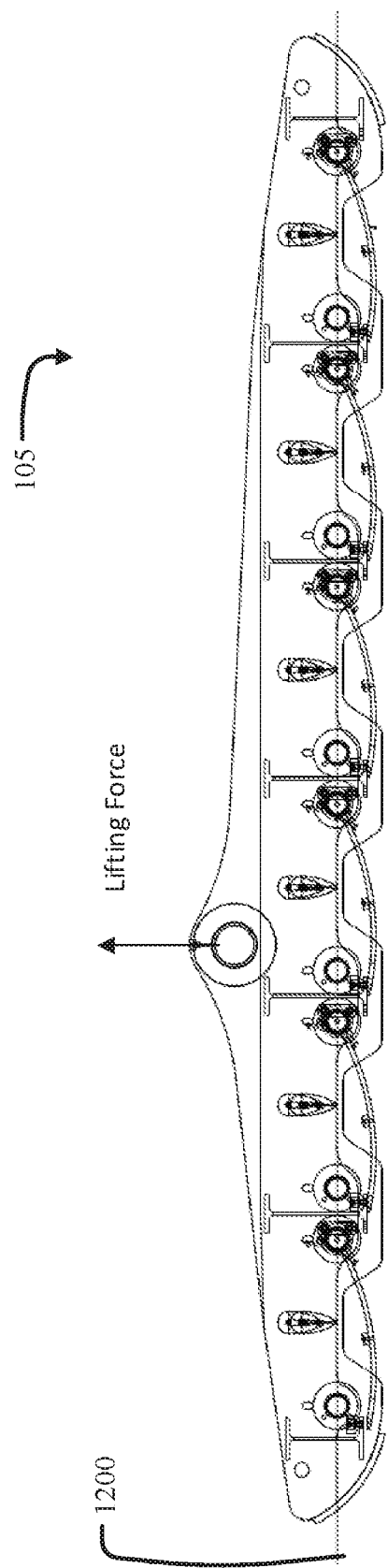
FIG. 12A illustrates a first stage of how the foot in FIGS. 1-11 is released from a surface according to at least one example embodiment.

FIG. 12A illustrates the foot 105 in first stage and at a first position that corresponds to the beginning of applying a lifting force (e.g., applied by an umbilical attached to the drill 100). Here, the louvers 713 are sunk into the surface 1200, and remain sunk under the weight of the drill 100. In at least one example embodiment, the depth at which the foot 105 is sunk into the surface may range from about 2 inches to about 5 inches. However, example embodiments are not limited thereto and the depth may vary according to design preferences. Here, it may be said that the louvers 713 are in a first position (or closed position).

Figure 12B:
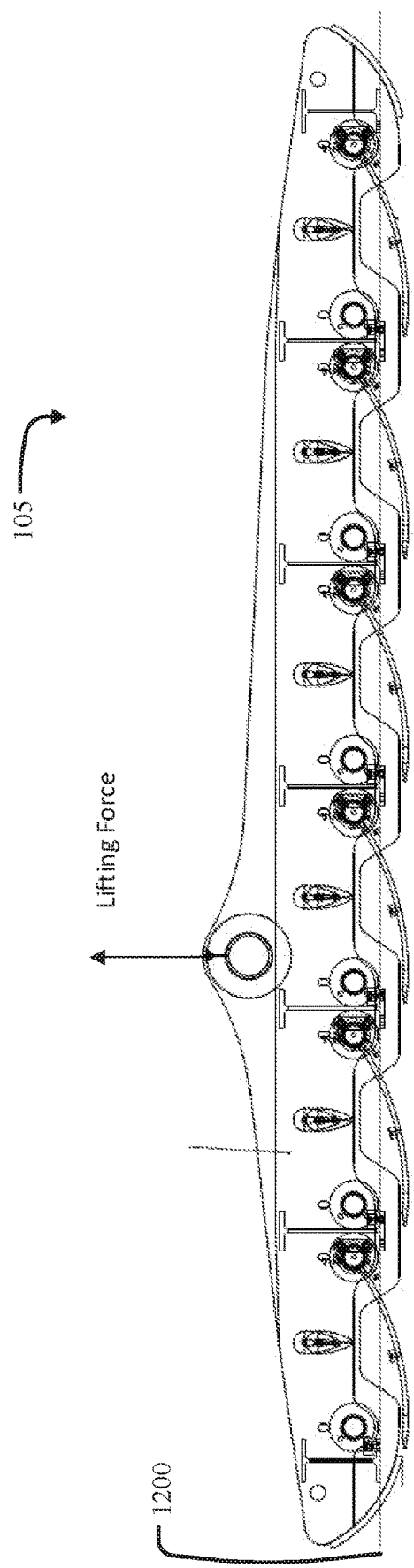
FIG. 12B illustrates a second stage of how the foot in FIGS. 1-11 is released from a surface according to at least one example embodiment.

FIG. 12B illustrates the foot 105 in a second stage of lift-off where the louvers 713 begin to open toward a second position at their hinges as a result of the suction force. Moving toward the second position may assist with release of the foot 105 from the surface 1200.

Figure 12C:
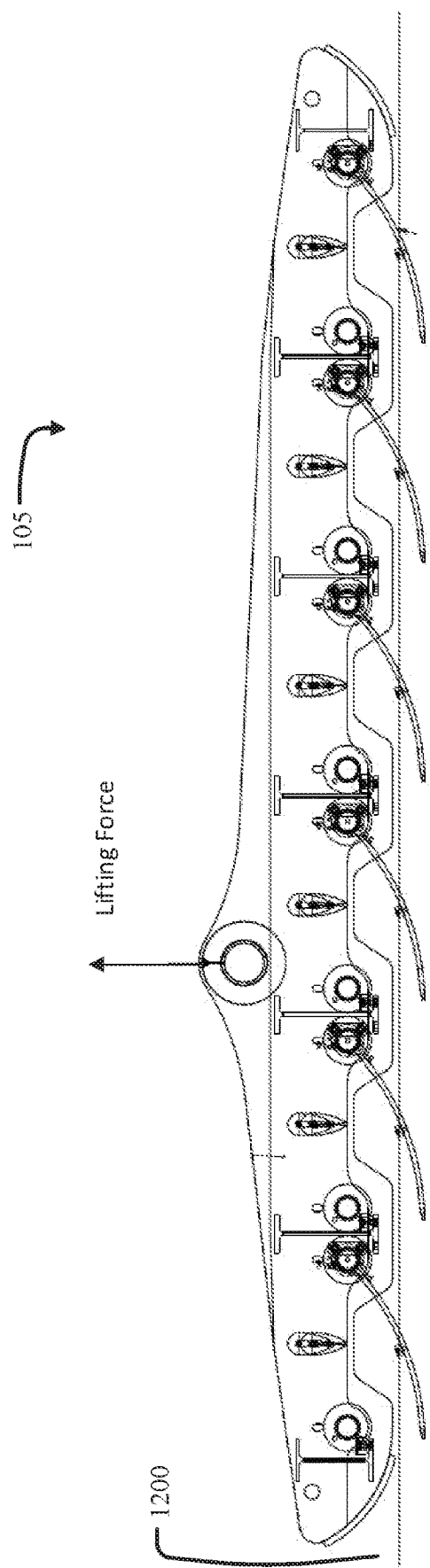
FIG. 12C illustrates a third stage of how the foot in FIGS. 1-11 is released from a surface according to at least one example embodiment.

FIG. 12C illustrates the foot 105 in a third stage of lift-off where the foot frame is released from the surface 1200, but the louvers 713 are still sunk but beginning to slide out of the surface 1200 as a result of moving toward the second position (or open position). Here, it should be understood that the torsion springs 720/721 are biased in a manner that allows the louvers 713 to open to a point that allows the louvers 713 to slide out of the surface 1200.

Figure 12D:
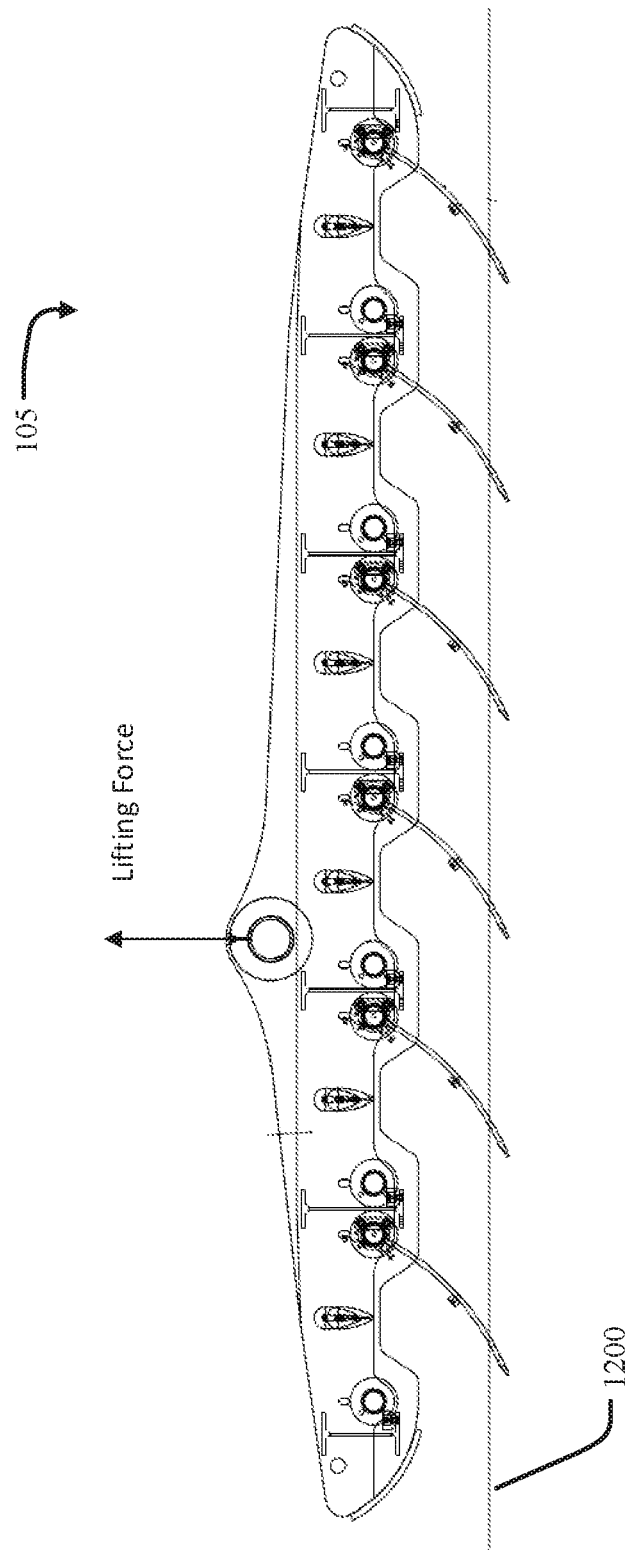
FIG. 12D illustrates a fourth stage of how the foot in FIGS. 1-11 is released from a surface according to at least one example embodiment.

FIG. 12D illustrates the foot 105 in a fourth stage of lift-off where the louvers 713 are almost released from the surface 1200. Here, the louvers 713 may be said to be almost at or at the second position. The second position may correspond to the louvers 713 being opened at a desired angle, such as 90 degrees or almost 90 degrees.

FIG. 12E illustrates the foot 105 in a fifth stage of lift-off where the louvers 713 are completely released from the surface 1200.

Figure 12F:
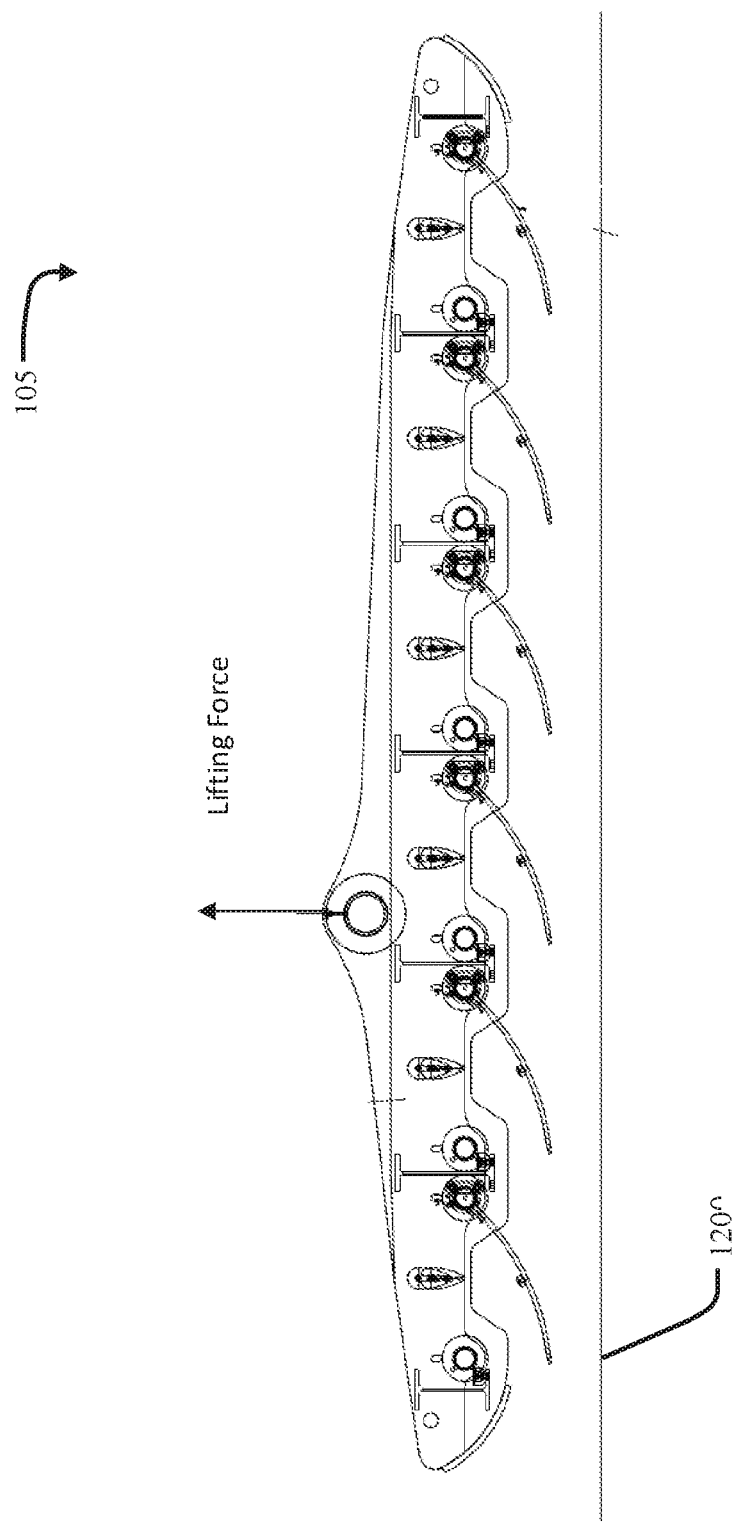
FIG. 12F illustrates a sixth stage of how the foot in FIGS. 1-11 is released from a surface according to at least one example embodiment.

FIG. 12F illustrates the foot 105 in a sixth stage of lift-off, where the louvers 713 are returning to the first position (or closed position). Here, presence of water reduces the impact of the louvers 713 on the bottom of cross members 705 by damping the closing speed.

Figure 12G:
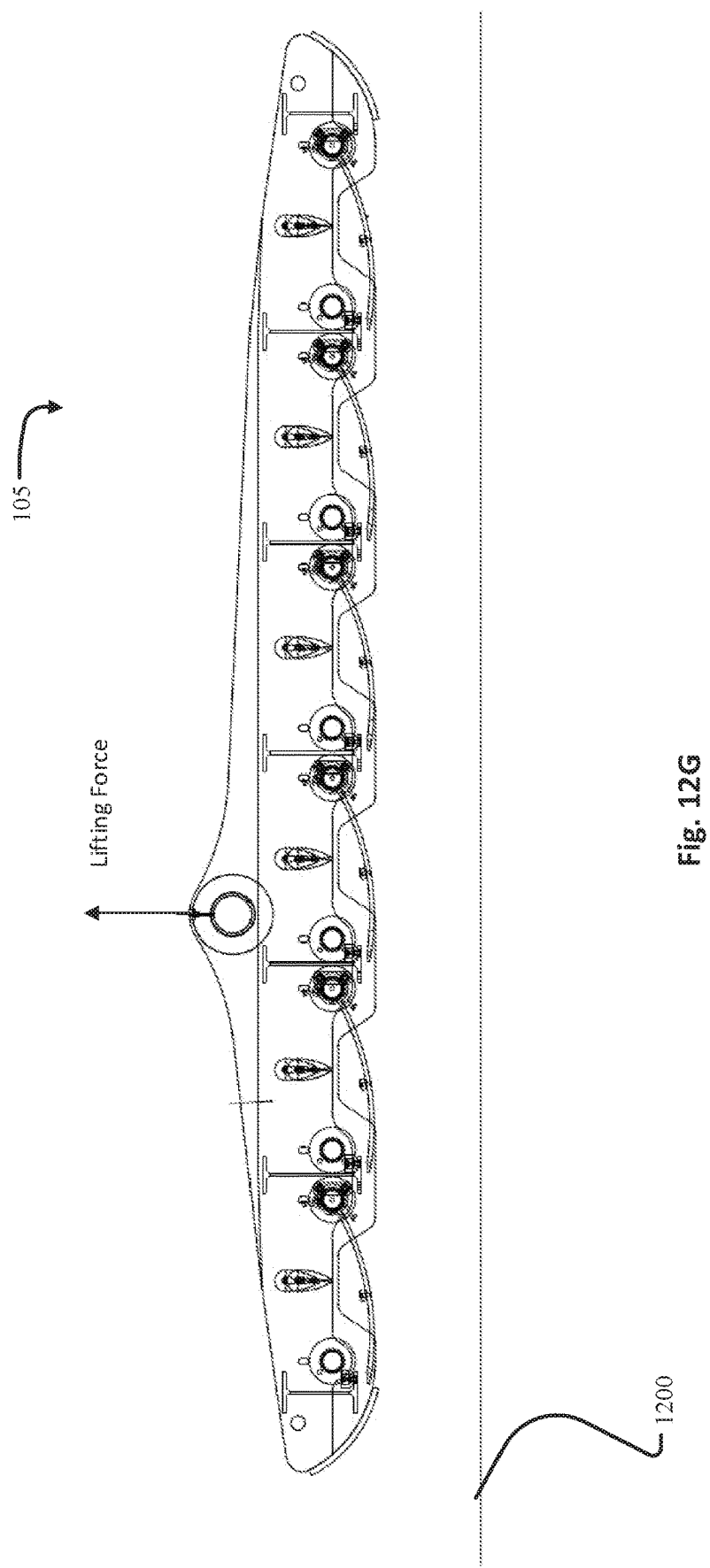
FIG. 12G illustrates a seventh stage of how the foot in FIGS. 1-11 is released from a surface according to at least one example embodiment.

FIG. 12G illustrates the foot 105 in a seventh stage of lift-off where the louvers 713 have returned to the first position shown in FIG. 12A as a result of the torsion springs 720/721 pulling the louvers 713 back into the first position. Now, the drill 100 may be fully removed from the underwater environment.

In view of the foregoing, it should be appreciated that example embodiments provide for drilling devices (e.g., underwater drilling devices) and feet of drilling devices that enable safe operation and easy retrieval of the drilling device from a surface, for example, a soft underwater environment.

At least one example embodiment provides a foot for a drilling device. The foot includes a foot frame and a plurality of louver assemblies attached to the foot frame. Each louver assembly includes a louver that is at a first position when the foot is on a surface and that is movable toward a second position to facilitate release of the foot from the surface.

According to at least one example embodiment, the foot frame includes a plurality of support rails parallel to one another and that extend in a first direction. Each of the plurality of support rails includes a plurality of holes. The foot frame includes a plurality of cross members parallel to one another and that intersect with the plurality of support rails.

According to at least one example embodiment, a first support rail and a second support rail of the plurality of support rails each include an attachment section that attaches to a leg assembly of the drilling device.

According to at least one example embodiment, the attachment section includes raised portions of the first and second support rails, and the raised portions each include a hole to accommodate a fastening pin of the leg assembly.

According to at least one example embodiment, each louver assembly includes one or more hollow connection elements on one side of the louver, one or more spring elements that bias the louver in the first position, a rod that passes through the one or more hollow connection elements, the one or more spring elements, and a subset of the plurality of holes, and a set of stoppers that secure the rod to the foot frame.

According to at least one example embodiment, each of a first end and a second end of the rod includes a recessed surface portion. The set of stoppers includes a first stopper fastened to a first outer support rail of the plurality of support rails and that sits the recessed surface portion of the first end of the rod, and a second stopper fastened to a second outer support rail of the plurality of support rails and that sits the recessed surface portion of the second end of the rod.

According to at least one example embodiment, a number of the plurality of support rails is four, a number of the one or more hollow connection elements is three, and each of the three hollow connecting elements is between two respective ones of the four support rails.

According to at least one example embodiment, the one or more spring elements include a first pair of torsion springs and a second pair of torsion springs.

According to at least one example embodiment, the first pair of torsion springs are oppositely wound, and the second pair of torsion springs are oppositely wound.

According to at least one example embodiment, a first support rail of the plurality of support rails includes a first opening that accommodates one end of each spring in the first pair of torsion springs, and a second support rail of the plurality of support rails includes a second opening that accommodates one end of each spring in the second pair of torsion springs.

At least one example embodiment provides a drilling device. The drilling device includes a drill frame including one or more drilling components for drilling into a surface, and one or more feet attached to the drill frame and that contact the surface to support the drill frame. Each of the one or more feet include a foot frame, and a plurality of louver assemblies attached to the foot frame. Each louver assembly includes a louver that is at a first position when the one or more feet are on the surface and that is movable toward a second position to facilitate release of the one or more feet from the surface.

According to at least one example embodiment, the foot frame includes a plurality of support rails parallel to one another and that extend in a first direction, and each of the plurality of support rails includes a plurality of holes in a first plane. According to at least one example embodiment, the foot frame includes a plurality of cross members parallel to one another and that intersect with the plurality of support rails.

According to at least one example embodiment, each louver assembly includes one or more hollow connection elements on one side of the louver, one or more spring elements that bias the louver in the first position, a rod that passes through the one or more hollow connection elements, the one or more spring elements, and a subset of the plurality of holes, and a set of stoppers that fasten to outer ones of the plurality of support rails to secure the rod to the foot frame.

According to at least one example embodiment, each of a first end and a second end of the rod includes a recessed surface portion, and the set of stoppers includes a first stopper fastened to a first outer support rail of the plurality of support rails and that sits the recessed surface portion of the first end of the rod, and a second stopper fastened to a second outer support rail of the plurality of support rails and that sits the recessed surface portion of the second end of the rod.

According to at least one example embodiment, the one or more spring elements include a first pair of torsion springs and a second pair of torsion springs.

According to at least one example embodiment, the first pair of torsion springs are oppositely wound, and the second pair of torsion springs are oppositely wound.

According to at least one example embodiment, a first support rail of the plurality of support rails includes a first opening that accommodates one end of each spring in the first pair of torsion springs, and a second support rail of the plurality of support rails includes a second opening that accommodates one end of each spring in the second pair of torsion springs.

According to at least one example embodiment, the drilling device further comprises one or more leg assemblies for attaching a corresponding one of the one or more feet to the drill frame, each leg assembly including a first end attached to the drill frame and a second end attached to the foot frame.

According to at least one example embodiment, at least one of the plurality of support rails includes an attachment section that attaches to the second end of a corresponding leg assembly.

According to at least one example embodiment, each leg assembly includes a hydraulic element that raises and lowers the one or more feet to level the drilling device on the surface.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

What is claimed is:

1. A foot for a drilling device, the foot comprising:
   a foot frame; and
   a plurality of louver assemblies attached to the foot frame, wherein each louver assembly includes a louver that is movable between a first position along a bottom of the foot frame and a second position protruding from the bottom of the foot frame, wherein, when the foot is raised from a surface, the louver moves from the first position toward the second position to facilitate release of the foot from the surface.

2. The foot of claim 1, wherein the foot frame includes:
   a plurality of support rails parallel to one another and that extend in a first direction, wherein each of the plurality of support rails includes a plurality of holes; and
   a plurality of cross members parallel to one another and that intersect with the plurality of support rails.

3. The foot of claim 2, wherein a first support rail and a second support rail of the plurality of support rails each include an attachment section that attaches to a leg assembly of the drilling device.

4. The foot of claim 3, wherein the attachment section includes raised portions of the first and second support rails, and wherein the raised portions each include a hole to accommodate a fastening pin of the leg assembly.

5. The foot of claim 2, wherein each louver assembly includes:
   one or more hollow connection elements on one side of the louver;
   one or more spring elements that bias the louver in the first position;
   a rod that passes through the one or more hollow connection elements, the one or more spring elements, and a subset of the plurality of holes; and
   a set of stoppers that secure the rod to the foot frame.

6. The foot of claim 5, wherein each of a first end and a second end of the rod includes a recessed surface portion, and wherein the set of stoppers includes:
   a first stopper fastened to a first outer support rail of the plurality of support rails and that sits the recessed surface portion of the first end of the rod; and
   a second stopper fastened to a second outer support rail of the plurality of support rails and that sits the recessed surface portion of the second end of the rod.

7. The foot of claim 5, wherein a number of the plurality of support rails is four, wherein a number of the one or more hollow connection elements is three, and wherein each of the three hollow connecting elements is between two respective ones of the four support rails.

8. The foot of claim 5, wherein the one or more spring elements include a first pair of torsion springs and a second pair of torsion springs.

9. The foot of claim 8, wherein the first pair of torsion springs are oppositely wound, and wherein the second pair of torsion springs are oppositely wound.

10. The foot of claim 9, wherein a first support rail of the plurality of support rails includes a first opening that accommodates one end of each spring in the first pair of torsion springs, and wherein a second support rail of the plurality of support rails includes a second opening that accommodates one end of each spring in the second pair of torsion springs.

11. A drilling device, comprising:
    a drill frame including one or more drilling components for drilling into a surface; and
    one or more feet attached to the drill frame and that contact the surface to support the drill frame, wherein each of the one or more feet include:
    a foot frame; and
    a plurality of louver assemblies attached to the foot frame, wherein each louver assembly includes a louver that is at a first position when the one or more feet are on the surface and that is movable toward a second position to facilitate release of the one or more feet from the surface.

12. The drilling device of claim 11, wherein the foot frame includes:
    a plurality of support rails parallel to one another and that extend in a first direction, wherein each of the plurality of support rails includes a plurality of holes in a first plane; and
    a plurality of cross members parallel to one another and that intersect with the plurality of support rails.

13. The drilling device of claim 12, wherein each louver assembly includes:
- one or more hollow connection elements on one side of the louver;
- one or more spring elements that bias the louver in the first position;
- a rod that passes through the one or more hollow connection elements, the one or more spring elements, and a subset of the plurality of holes; and
- a set of stoppers that fasten to outer ones of the plurality of support rails to secure the rod to the foot frame.

14. The drilling device of claim 13, wherein each of a first end and a second end of the rod includes a recessed surface portion, and wherein the set of stoppers includes:
- a first stopper fastened to a first outer support rail of the plurality of support rails and that sits the recessed surface portion of the first end of the rod; and
- a second stopper fastened to a second outer support rail of the plurality of support rails and that sits the recessed surface portion of the second end of the rod.

15. The drilling device of claim 13, wherein the one or more spring elements include a first pair of torsion springs and a second pair of torsion springs.

16. The drilling device of claim 15, wherein the first pair of torsion springs are oppositely wound, and wherein the second pair of torsion springs are oppositely wound.

17. The drilling device of claim 15, wherein a first support rail of the plurality of support rails includes a first opening that accommodates one end of each spring in the first pair of torsion springs, and wherein a second support rail of the plurality of support rails includes a second opening that accommodates one end of each spring in the second pair of torsion springs.

18. The drilling device of claim 12, further comprising:
- one or more leg assemblies for attaching a corresponding one of the one or more feet to the drill frame, each leg assembly including a first end attached to the drill frame and a second end attached to the foot frame.

19. The drilling device of claim 18, wherein at least one of the plurality of support rails includes an attachment section that attaches to the second end of a corresponding leg assembly.

20. The drilling device of claim 18, wherein each leg assembly includes a hydraulic element that raises and lowers the one or more feet to level the drilling device on the surface.

* * * * *